United States Patent
Abe et al.

(10) Patent No.: US 6,801,983 B2
(45) Date of Patent: *Oct. 5, 2004

(54) DISK CONTROL DEVICE AND STORAGE DEVICE USING IT

(75) Inventors: Tetsuya Abe, Odawara (JP); Nobuyuki Minowa, Odawara (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/141,601

(22) Filed: Aug. 28, 1998

(65) Prior Publication Data

US 2001/0044883 A1 Nov. 22, 2001

(30) Foreign Application Priority Data

Sep. 3, 1997 (JP) ............................................ 09-238685

(51) Int. Cl.[7] .............................................. G06F 12/00
(52) U.S. Cl. ........................................ 711/130; 714/43
(58) Field of Search ................................ 711/118, 130; 714/43, 4, 7, 8

(56) References Cited

U.S. PATENT DOCUMENTS

| | | | |
|---|---|---|---|
| 5,206,939 A | | 4/1993 | Yanai et al. |
| 5,394,555 A | * | 2/1995 | Hunter et al. ................ 711/148 |
| 5,459,856 A | | 10/1995 | Inoue |
| 5,568,609 A | * | 10/1996 | Sugiyama et al. ............. 714/43 |
| 5,680,579 A | * | 10/1997 | Young et al. ................ 711/100 |
| 5,726,895 A | | 3/1998 | Kumakura et al. |
| 5,761,531 A | | 6/1998 | Ohmura et al. |
| 5,819,054 A | * | 10/1998 | Ninomiya et al. ........... 710/128 |
| 6,237,046 B1 | | 5/2001 | Ohmura et al. |

FOREIGN PATENT DOCUMENTS

| | | |
|---|---|---|
| DE | 4422786 | 1/1995 |
| JP | 4276698 | 10/1992 |
| JP | 6314110 | 11/1994 |
| JP | 7020994 | 1/1995 |
| JP | 7244634 | 9/1995 |
| JP | 8272542 | 10/1996 |
| JP | 8335144 | 12/1996 |
| JP | 916474 | 1/1997 |
| WO | 9425908 | 4/1994 |

* cited by examiner

*Primary Examiner*—Matthew D. Anderson
(74) *Attorney, Agent, or Firm*—Antonelli, Terry, Stout & Kraus, LLP (57) ABSTRACT

An apparatus for use in a storage device having at least two clusters, each including a disk control device having a plurality of channel controllers that send and receive commands and data to and from an upper system, a plurality of disk controllers that control disk units, and a cache that temporarily stores data between the upper system and the disk units. The apparatus includes a first bus included in a first cluster. The first bus is connected to the channel controller, the disk controller and the cache of the first cluster. A second bus is included in a second cluster. The second bus is connected to the channel controller, the disk controller and the cache of the second cluster. A common resource is connected to the first bus of the first cluster and the second bus of the second cluster. The common resource includes a specified set of data which is commonly accessible from each of the channel controllers or the disk controllers of the clusters.

22 Claims, 9 Drawing Sheets

LOLD/LNEW

| LOCK | MPID | QUE |

LCNTL

| CMP DATA | CNT MODE | QUEPOS |

| Name | Function |
|---|---|
| LOCK | Indicates the resource is in lock. |
| MPID | Indicates ID number of MP that locks the resource. |
| QUE | Indicates the waiting queue of MP waiting the resource is locked. |

FIG. 11

| Name | Function |
|---|---|
| CMPDATA | Comparing data for judging lock is renewed. |
| CNTMODE | Control mode for locking the resource. *1 |
| QUEPOS | Indicates the waiting queue of MP waiting the resource is locked. |

*1 Example: "new lock", "new lock + registration of waiting", "unlock", "acquiring forced lock", "releasing forced lock", etc.

FIG. 12

•<conventional composition>

| | DKC(101) | |
|---|---|---|
| | bus0 | bus1 |
| normal | sequential | |
| | transaction | transaction |
| 1 bus failed | × | sequential |

•<clustered bus> (present invention)

| | cluster 1 | | cluster 2 | |
|---|---|---|---|---|
| | C1bus0 | C1bus1 | C2bus0 | C2bus1 |
| normal | transaction | transaction | transaction | transaction |
| | sequential | | transaction | transaction |
| | sequential | | sequential | |
| 1 bus failed | × | transaction | transaction | transaction |
| | × | transaction | sequential | |
| 2 buses failed | × | transaction | transaction | × |
| 3 buses failed | × | sequential | × | × | ns
DISK CONTROL DEVICE AND STORAGE DEVICE USING IT

BACKGROUND OF THE INVENTION

The present invention relates to a disk control device or a storage device which stores a large amount of information. More particularly the present invention relates to apparatus for use in a disk control device or a storage device that prevents system downtime and a degeneration in the operation of the device due to a failed part in the device or when the device has partially failed. Even more particularly the present invention provides apparatus that allows for high availability or maintainability in a disk control device or a storage device in which failed parts are exchanged without stopping the device.

In large data storage equipment or large storage systems which store customer information, such as an on-line banking system, it is highly desired to have equipment or a system wherein the stored data is continually available and the equipment or system is easily maintainable. In such equipment or system the operation thereof does not degenerate when a failure has occurred in any part of the equipment or failure. Further, in such equipment or system failed parts can be exchanged without stopping operation thereof.

Storage devices using magnetic disk storage units as a storage media have been proposed. Such systems are known as Redundant Arrays of Inexpensive Disks (RAID) systems. Magnetic disk storage units are quite suitable in such an application since they provide large storage capacity for a unit price. Recently a non-stop system has been proposed by adopting a RAID system in which availability and maintainability is provided by exchanging the magnetic disk units.

Figure 1:
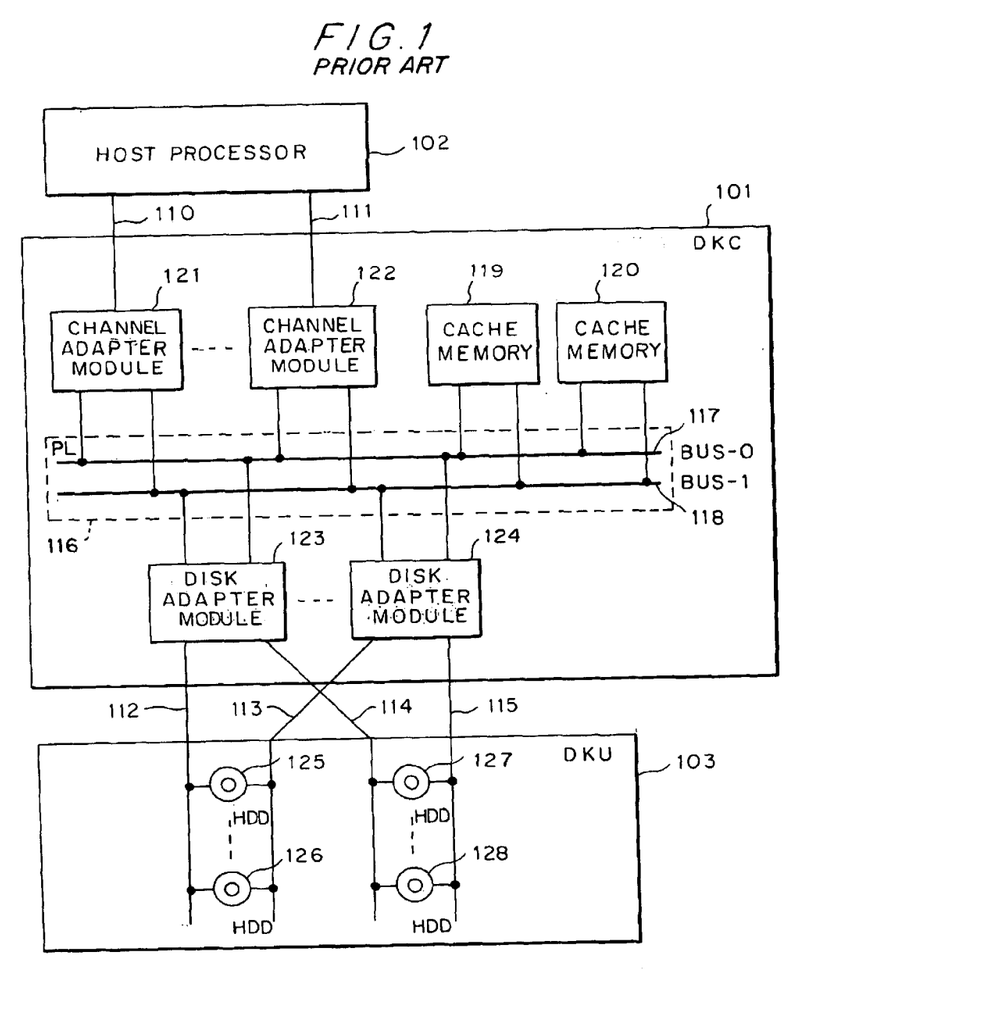
FIG. 1 illustrates a conventional disk controller.

FIG. 1 is an example of the construction of a conventional large storage system. A disk controller (DKC) 101 is connected to a host processor 102 as an upper unit through channels 110 and 111. The DKC 101 is also connected to a disk unit (DKU) 103 as an lower unit through drive buses 112, 113, 114 and 115. Various modules described below are connected to common buses bus0 and bus1 117 and 118 respectively wired on a platter (PL) which is the wiring base inside the DKC 101.

Memory modules 119 and 120 are semiconductor memory (CACHE) containing a copy of data stored in DKU 103, and data which are transferred from the host processor 102 and stored in DKU 103. The channel adapter modules (CHA) 121 and 122 are connected to the channels 110 and 111. The CHA 121 and 122 control data transfer between the host processor 102 and the memory modules 119 and 120. Disk adapter modules (DKA) 123 and 124 are connected to drives 125 to 128 in DKU 103 through the drive paths 112 to 115. The DKA's 123 and 124 control data transfer between the memory modules 119 and 120 and the drives 125 to 128. The memory modules 119 and 120 also store control information required for data transfer control which CHA 121, 122 and DKA 123, 124 control. The common buses 117 and 118 are used as paths for data transfer and access for control information between CHA 121, 122 or DKA 123, 124 and memory modules 119 and 120, and for communication between CHA 121, 122 and DKA 123, 124.

The common buses 117 and 118 are composed of a plural number of buses which are physically independent from each other, and their transfer modes are selected by a bus command during the transfer. There are a sequential data transfer mode in which buses logically operate as one bus, and a transaction data transfer mode in which each of the buses operates independently. In the DKC 101 all of hardware parts excepting PL 116 are multiplexed, thereby preventing a complete stop in DKC 101 due to a degenerative process resulting from a partial failure. Non-stop exchanging in all of hardware parts excepting PL1 116 is possible by non-disruptive exchange of each module. However, there are some problems described below when a part of the device has failed.

Figure 8:
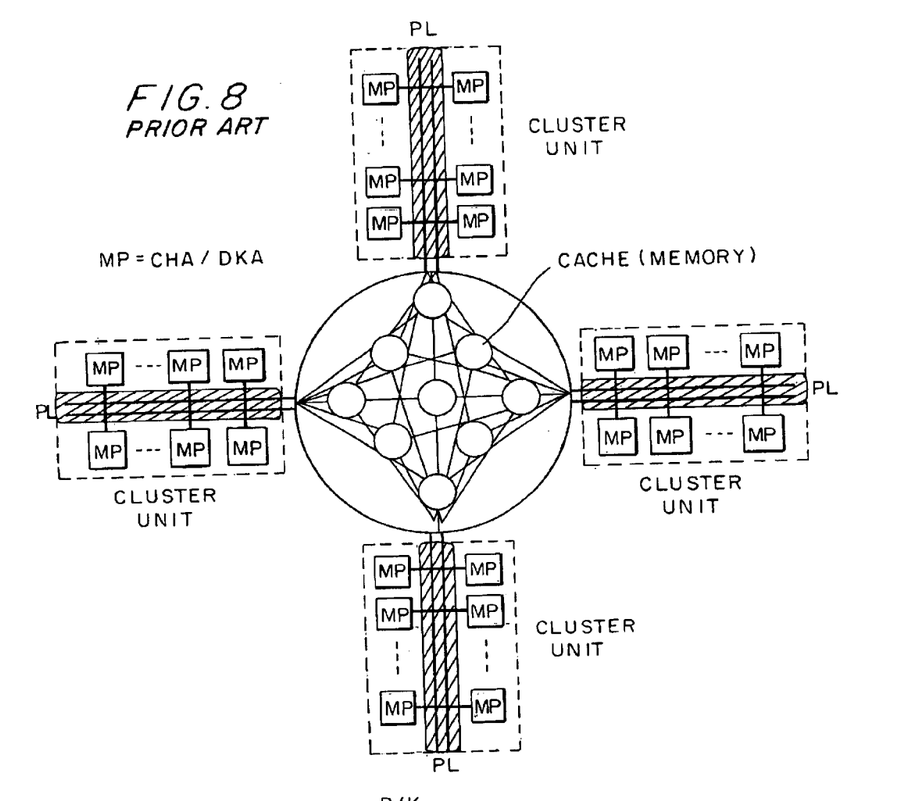
FIG. 8 illustrates a conceptual structure of a conventional computer system to which the present invention can be applied.

FIG. 8 illustrates a configuration, similar to that described in Japanese unexamined patent publication 04-276698, of a conventional wiring board, wherein two wiring boards are provided and one of the wiring boards has one of the bus lines and the other of the wiring boards has the other of the bus lines. In FIG. 8, the two wiring boards are shown as being attached back to back and each printed wiring substrate (MP) is shown as being connected to both of the bus lines of the two wiring boards. Although two wiring boards are disclosed as being connected to each other using a printed circuit board, the details of the printed circuit board are not shown.

In a computer system constructed according to that illustrated in JP-4-276698 system downtime due to bus degeneration can be avoided. Such is possible even when the failure is due to the breaking of wires in the PL itself. However, the disadvantage is that the system must be stopped when the failed bus is to be exchanged, because the failed bus is included in the PL. A further, disadvantage is that the performance of the computer system deteriorates due to the limited transfer bus mode in the operation performed by the degenerated bus.

SUMMARY OF THE INVENTION

An object of the present invention is to provide an apparatus which connects the common buses of different platters (PL's) to each other by use of a connector, wherein each PL is divided into two, thereby allowing a failed PL to be exchanged during operation of the other PL.

Another object of the present invention is to provide an apparatus which permits access to common resources across clusters by use of a communication method, wherein a data transfer mode can be selected based on the state of the clusters.

Yet another object of the present invention is to provide apparatus which improves bus performance and allows for non-stop maintenance for common bus failures in a computer system represented by a large storage device.

The present invention provides a disk control device or a storage device having a plurality of clusters interconnected to each other by a common resource. Each cluster includes a plurality of common buses which are connected to a disk controller (DKA), a channel controller (CHA) and a cache (CACHE). The common resource connects each of the common buses to each other between the clusters.

The common resource includes shared memory and cache memory which allows access from other clusters. The common resource provides lock bits in a control table in the shared memory for indicating whether access to resources corresponding to the bits is possible. Also provided is a microprocessor (MP) communication function using interruption signals between microprocessors in each CHA and DKA to effect communication from a module in one cluster to that in another cluster. This function allows for synchronization to be established in bus modes between clusters and to resolve conflicts in accesses to the common resource. Bus transfer performance in the system increases relative a system in which parallel transfer using common buses across plural clusters is conducted.

The structure of the present invention allows for multiple clusters to be connected to each other and can be applied not only to a large storage device adopting RAID technology but also to a device adopting SLED technology.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which.

DETAILED DESCRIPTION OF THE PREFERRED EMBODIMENTS

Figure 2:
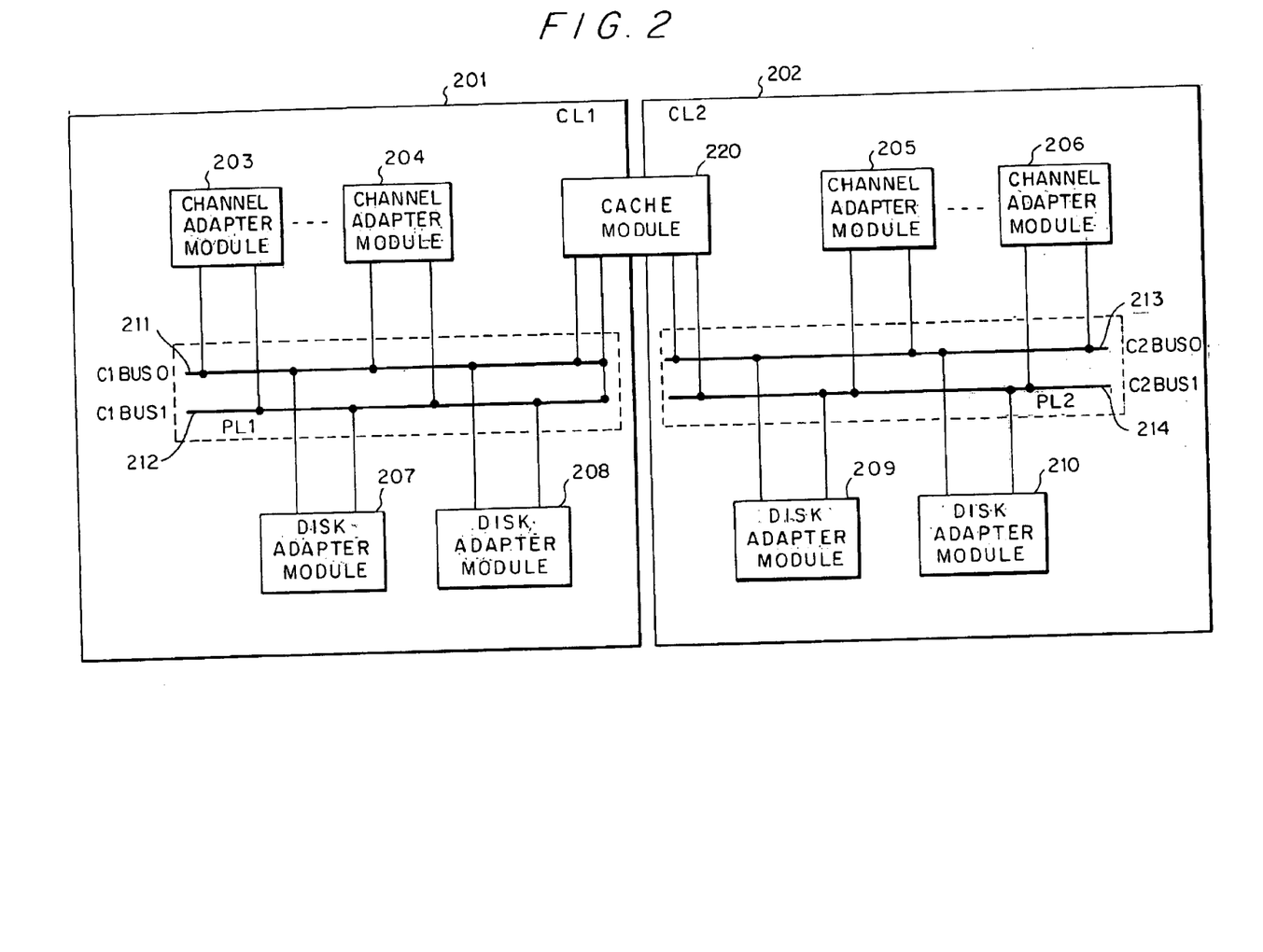
FIG. 2 illustrates the construction of an apparatus having plural clusters connected by a connector according to the present invention.

FIG. 2 illustrates the construction of an embodiment of the present invention. Only parts which differ from that in FIG. 1 are explained, omitting the parts having the same construction or the same operation.

The device illustrated in FIG. 2 includes a plural number of clusters CL1 201 and CL2 202. FIG. 2 illustrates two (2) clusters. However, these are just shown for illustration purposes. Any number of clusters can be provided. Each cluster preferably includes at least two parallel common buses 211 and 212 for CL1 201 and common buses 213 and 214 for CL2 202. However, each cluster can include only one common bus. The clusters each includes system modules CHA 203–CHA 204 and DKA 207 and DKA 208 for CL1 201 and CHA 205–CHA 206 and DKA 209 and DKA 210 for CL2 202. The system modules of CL1 201 are connected around PL1 which includes common buses 211 and 216. The system modules of CL2 202 are connected around PL2 which includes common buses 213 and 214. Each of CHA 203 to DKA 210 contains a microprocessor.

Each cluster CL1 201 and CL2 202 form a multi-microprocessor controller system around the common buses in the cluster.

Figure 9:
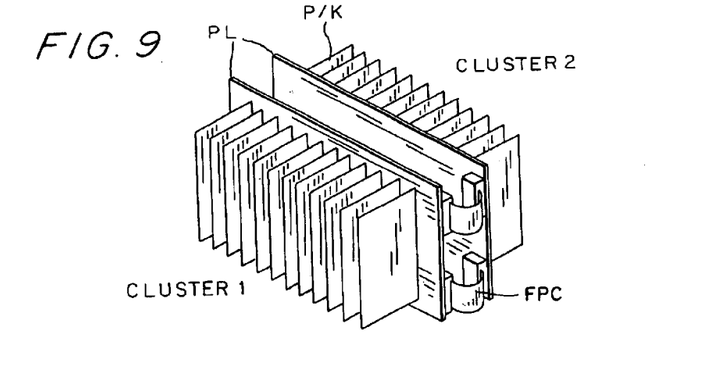
FIG. 9 illustrates an example of connection between clusters.

A difference between the device illustrated in FIG. 1 and the present invention as illustrated in FIG. 2 is the arrangement of the cache 220 which is a common resource element. The cache 220 is connected across the clusters so as to be accessed from any of the clusters. Connections between clusters are established by connecting between PL1 and PL2 using connectors or cables as illustrated in FIG. 9.

The cache 220, which is connected to both clusters, includes a memory module, a cache module, etc. such as a shared memory or a cache memory, and is accessible from CHA 203, 204, 205 and 206, and DKA 207, 208, 209 and 210 which are modules in the clusters, through common buses Clbus0 211, Clbus1 212, C2bus0 213 and C2bus1 214 for the clusters. The overall transfer performance of the device is doubled due to a construction in which the cache 220 can be simultaneously accessed from the cluster CL1 201 and the cluster CL2 202. Overall transfer performance can be multiplied by approximately n if the number of clusters is increased to n as illustrated for example in FIG. 8.

The above-described accesses can be performed independently from the common bus in a transaction transfer mode and also common buses can be operated logically as a bus in a sequential mode transfer. By use of the above-described structure of the present invention, as illustrated in the table shown in FIG. 12, a sequential bus transfer can be accomplished which are not possible in the conventional apparatus. In the system in the present invention, combinations of buses that are independent to each cluster are possible and two or more bus modes are both possible in a cluster. Bus modes can be flexibly modified to adapt to the details of the process. Each bus mode can be operated in the same data transfer mode in each cluster, or inversely established independently in each cluster.

Figure 12:
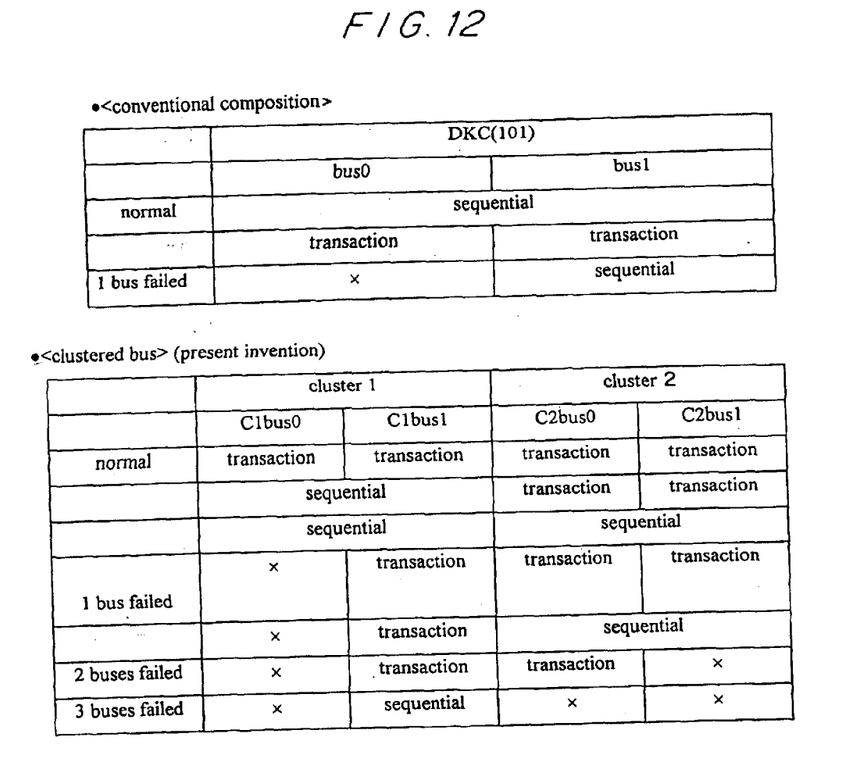
FIG. 12 is a table explaining an example of mode selecting on a bus failure.

The transfer mode in conventional apparatus can not be modified due to degenerative bus operation when the common bus fails as shown in the table of FIG. 12. However, in the present invention, although a cluster with a failure degenerates its bus, in a cluster not having the failure either of the transaction transfer mode and the sequential transfer mode can be selected. Thus, a bus transfer mode fitted to the system condition can be flexibly established so as not to deteriorate overall performance when a failure occurs.

Figure 3:
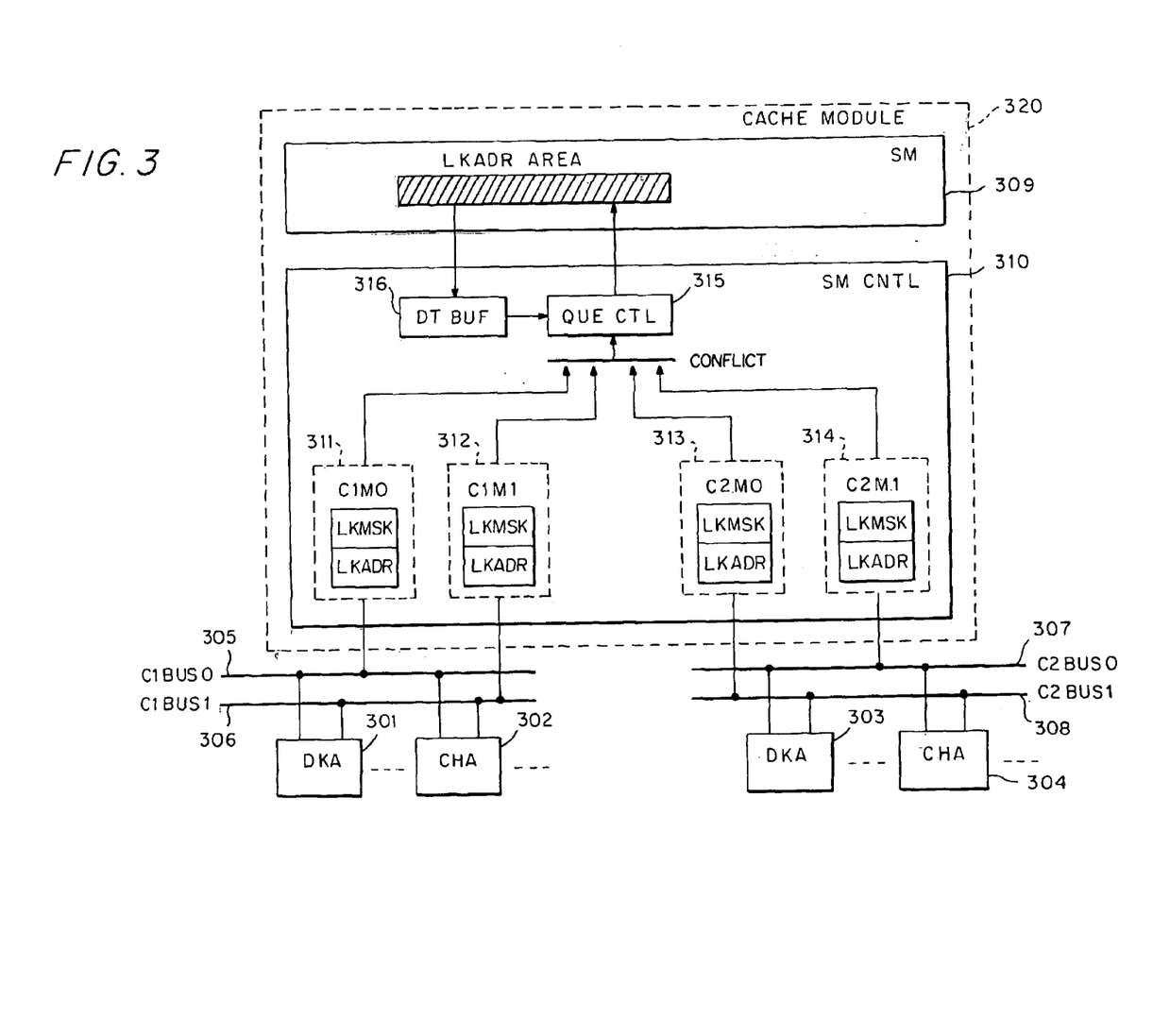
FIG. 3 illustrates an embodiment of the present invention in which particular resources are locked.
Figure 4:
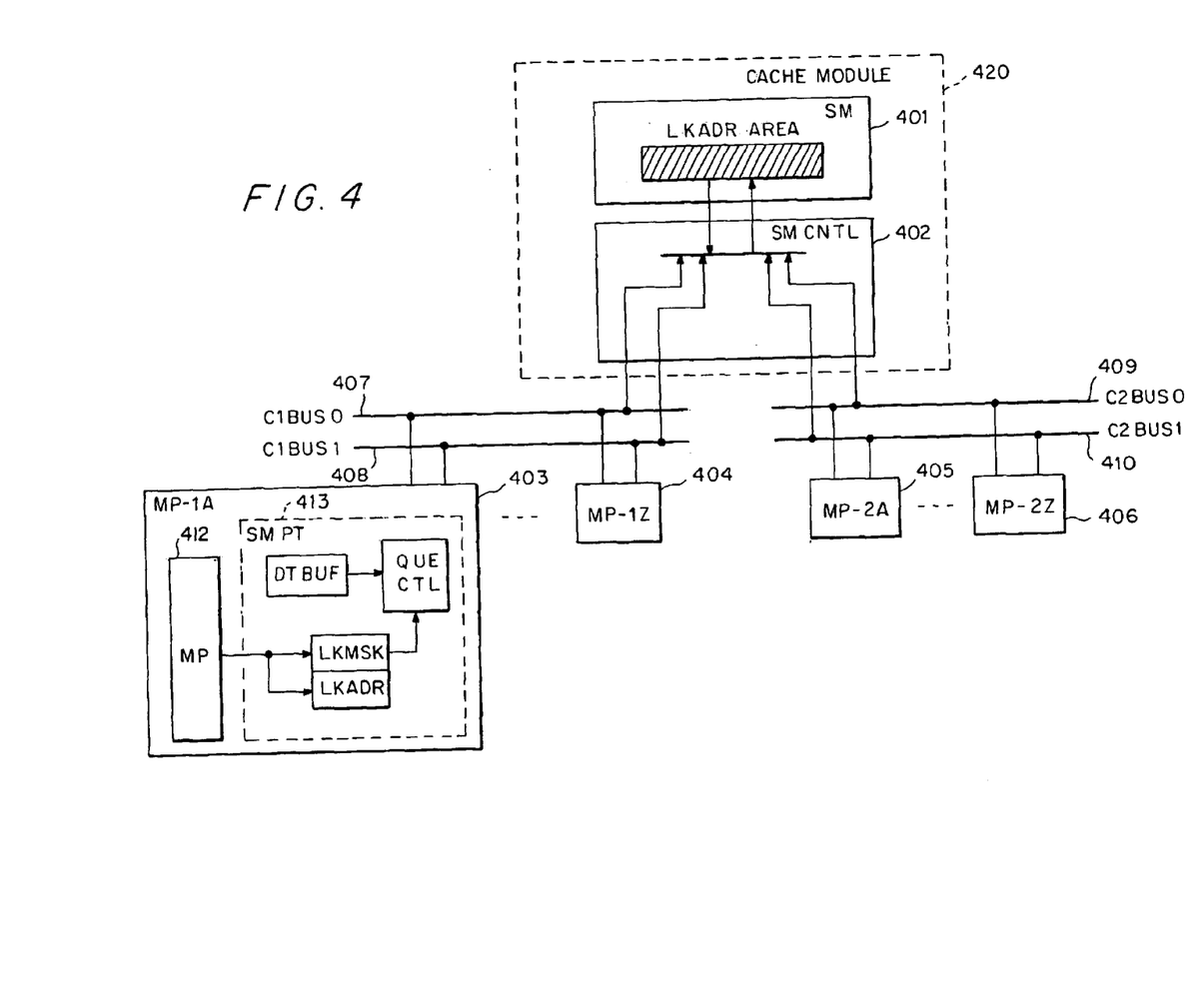
FIG. 4 illustrates another embodiment of the present invention in which particular resources are locked.

The cache 220 FIG. 2 receives addresses, data and commands (address/data/command) from each common bus. An arbitration is performed internally with respect to each received address/command, and the memory is accessed by a read/write operation. In cache 220, read/write operations to the same address issued from a plural number of buses are executed without any modification. In the case that write instructions are issued simultaneously from cluster CL1 201 and the cluster CL2 202 to the same address (i.e. in the case of conflict in the buses), data to be written to the memory are written exclusively among microprocessors accessing from the cluster CL1 201 and the cluster CL2 202. The conflict is resolved, for example, by memory lock control. An embodiment where resources lock control is performed with respect to the cluster to be accessed by the cache 220 is illustrated in FIG. 3. Another embodiment where the function of resource lock control is performed with respect to the cluster which requests access is illustrated in FIG. 4. This function of resource lock control can be provided in each of the modules CHA203 to DKA210.

Embodiment 1 to Solve Conflict (the Common Resource Side)

In FIG. 3, DKA301 having a microprocessor MP-1A and CHA302 having a microprocessor MP-2A are connected to the common buses C1bus0 305 and C1bus1 306 in the same cluster. And DKA303 having a microprocessor MP-1Z and CHA304 having a microprocessor MP-2Z are also connected to the common buses C2bus0 307 and C2bus1 308 in the same cluster. MP-1A (DKA301) and MP-2A (CHA302) are connected to the common buses 305–308 in the two clusters by the shared memory (SM) 309 and a SM control circuit (SM CNTL) 310 of the cache 320. The SM CNTL 310 includes C1M0 311, C1M1 312, C2M0 313 and C2M1 314 which supervise lock mask LKMSK and lock address (LKADR) for each common bus.

Each microprocessor described above inputs a lock address (LKADR) to SM CNTL 310 and gets information of the lock status of a resource by the lock mask (LKMSK). SM CNTL 310 reads the indicated lock address (LKADR), stores data that have been read to a data buffer DT BUF 316. Queue controller QUE CTL 315 calculates queue information (QUE) using the LKMSK and LKADR. The result of the access to the lock address (lock access) is reported to each microprocessor module through the common buses 305, 306, 307 and 308 in each cluster, and each of modules 301 to 304 monitors LKADR and QUE information and accesses to LKADR when its turn comes to the top of the QUE, to determine whether the LKMSK has been released. When an access occurs from the top module of the QUE, the common memory control SM CNTL 310 writes data to LKADR addressed by the SM and renews the LKMSK.

Embodiment 2 to Solve Conflict (Each Microprocessor Module Side)

Next is a description of an embodiment in which a function of solving a conflict is included is included in each of CHAs and DKAs.

In FIG. 4, microprocessor based modules MP-1A 403 and MP-1Z 404 are connected to the common buses C1bus0 407 and C1bus1 408 in the same cluster. Microprocessor based modules MP-2A 405 and MP-2Z 406 are also connected to the common buses C2bus0 409 and C2bus1 410 in the same cluster. SM 401 is connected to the common buses 407 to 410 in two clusters through SM CNTL402. In this embodiment a conflict of the lock access in the shared memory SM is solved by a microprocessor (MP) 412 in each module that calculates the QUE. Namely MP-1A 403 supervises the lock mask LKMSK, the lock address LKADR and the QUE, thereby arranging a shared memory port (SM PT) 413 between MP 412 and the buses 407 and 408 in the cluster.

The microprocessor MP 412 writes a lock address LKADR and a lock mask LKMSK to the SM PT 413 and performs a lock access. The SM PT 413 reads the lock address in the SM 401 through SM CNTL 402. The que is calculated in the SM PT 413from data in the lock mask and data that was read out, and the result is written to LKADR in SM 401. Other accesses are rejected in the SM CNTL 402 by a lock command in the SM PT 413 and SM CNTL 402.

Embodiment for Establishing the Lock Mask and Queue

The above-described embodiments solving conflicts lock mask and a queue. An embodiment of a lock mask and a queue are described below.

Figure 5:
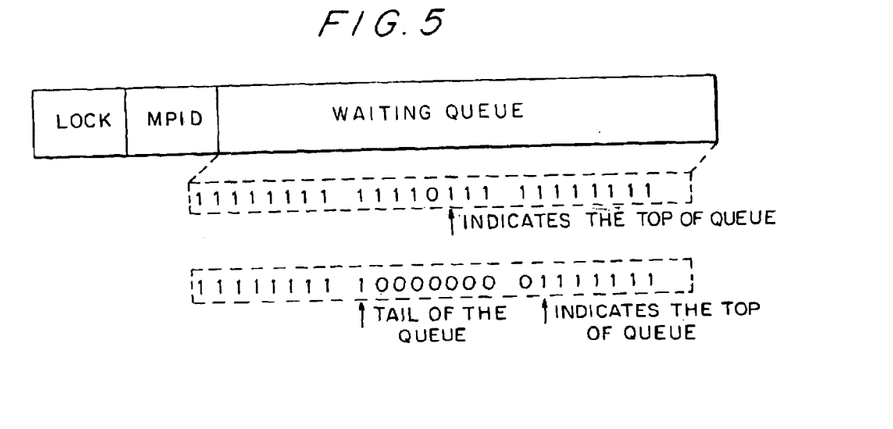
FIG. 5 illustrates a work structure of a lock mask of the present invention.

FIG. 5 illustrates a word structure of the lock address LKADR holding the lock mask and the queue information as elements. The lock mask LKMSK indicates that the word structure is in a lock state. The MPID indicates identification (ID) own ID value of the locked microprocessor in which the lock bit is ON. When the lock bit is ON, MPID is guaranteed until the lock is released. The waiting queue is information for preventing too long of a suspension of the microprocessor if a busy condition occurs due to a lock state for an extended period of time. A suspension that extends too long indicates that the processor never reaches its turn to perform an access.

Figure 6:
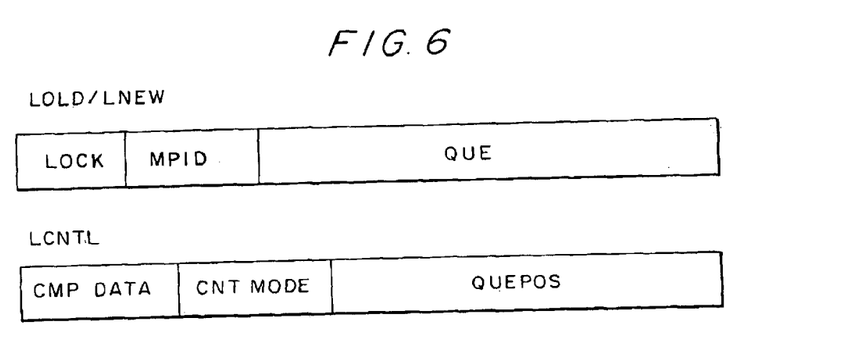
FIG. 6 illustrates the construction of a register which holds parameters for lock control.
Figure 10:
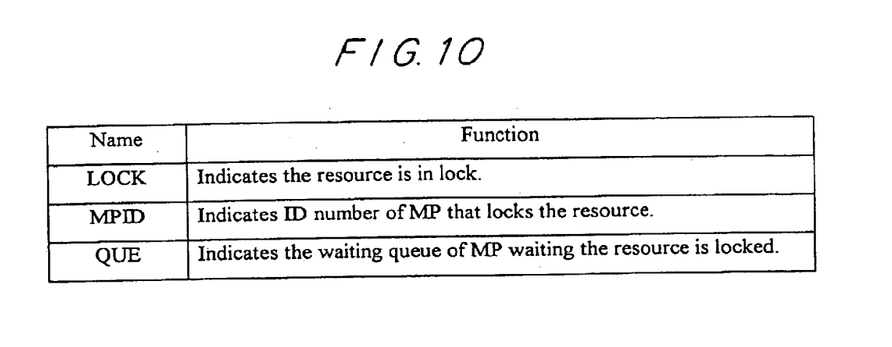
FIG. 10 is a table explaining elements and functions of register LOLD/LNEW.
Figure 11:
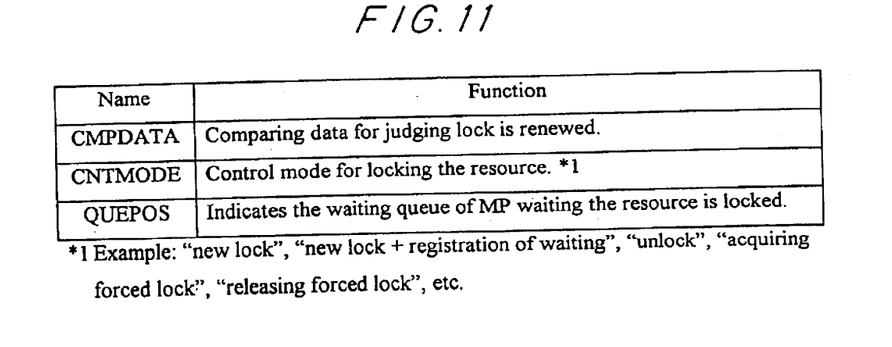
FIG. 11 is a table explaining elements and functions of register LCNTL.

Bit allocation of the waiting queue is information to guarantee the order of locks by delaying a lock operation, so that an unnecessary lock operation does not occur at the moment the bit just before it, that has been newly registered at the end of the waiting queue in case of lock busy, has turned OFF. The waiting queue in FIG. 5 has a ring structure for example and supervises the order in making a bit at value 0 as a top of the queue. FIGS. 6, 10 and 11 illustrate examples of establishing a register as a control circuit parameter, and FIG. 7 illustrates a flowchart of the process.

In FIG. 6, the LOLD is a register to store data before renewal of the lock mask loaded from the SM. The LNEW is a register to store renewed data of the lock mask loaded from the SM. The LCNTL includes of a CMP DATA, a CNT MODE and a QUEPOS, and the CMP DATA is comparing data to judge renewal of lock. Namely, it is comparing data to the lock byte (LOCK and MPID) in the lock mask, and the lock state is renewed only when the. lock byte agrees with the CMP DATA.

The CNTMODE establishes the control mode in operation when the resource is locked, and an execution/non-execution of the waiting queue registration is controlled by this mode when the CMP DATA does not agree with the lock byte. The QUEPOS establishes the OFF position of the waiting queue when the queue bit is removed (OFF). An illegal waiting queue bit pattern (pattern with some bits missing, example: "0101" or like that) is detected by reading a new SM data stored in the LNEW register.

Figure 7:
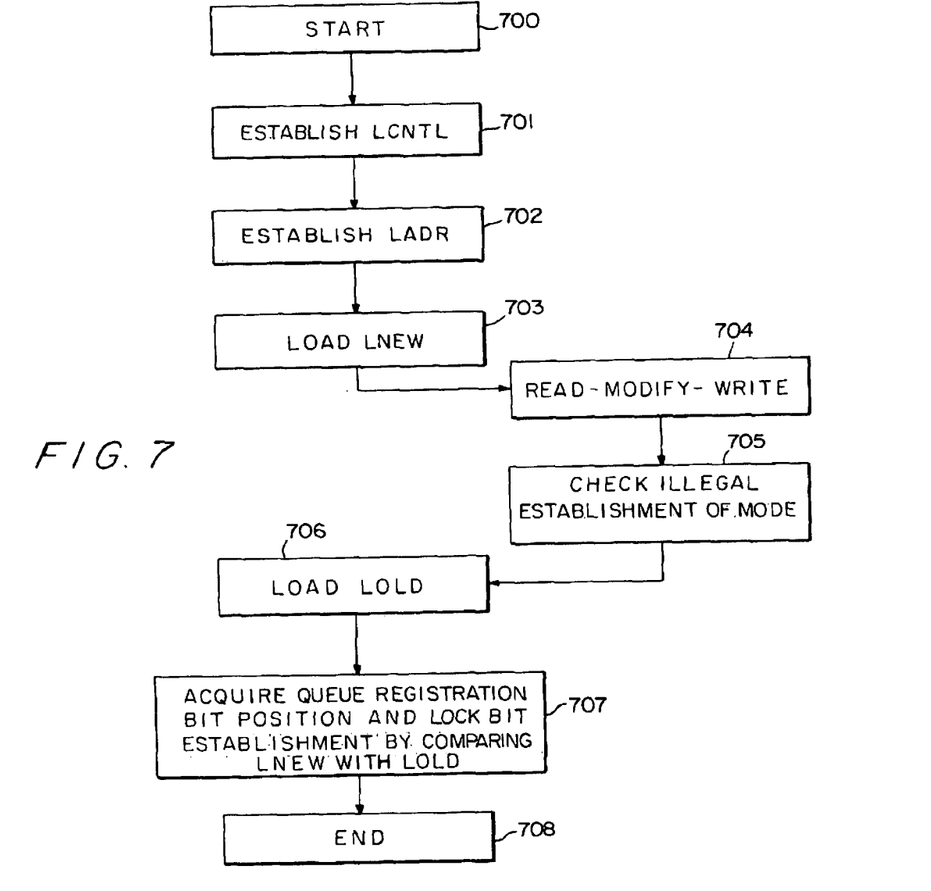
FIG. 7 illustrates a flowchart for establishing parameters for lock control and processing an access to a lock address.

The flowchart illustrated in FIG. 7 is described below. After the LADR is established following the LCNTL mentioned above, the LNEW is loaded (steps 700–703). Then an illegal mode establishment is checked through read-modify-write operation steps (steps 704 and 705). The LOLD is loaded (step 706) and compared with the LNEW. Thereafter a lock bit is established if necessary, and then a waiting queue is registered after a position of the new queue register bit is calculated (step 707).

The present invention has further advantages that buses can be repaired without system downtime for a failure of the common buses. Namely, one cluster contains at least two or more common buses, and if a failure in either of the buses is detected, the system module stops use of the failed bus and makes use of the remaining normal (non-failed) buses.

To repair the failed bus, in the cluster that stops operation due to blocking, and degenerates the operation of the cluster of failed side, the PL containing common buses can be exchanged by removing connecting cables or connectors between clusters. By this, problems of failure and repair in the common buses that was conventionally a problem in the disk control device adopting a common bus architecture, can be solved.

Each microprocessor must have a communication apparatus to detect the failed bus and to control switching of the transfer bus. As a communication apparatus of the microprocessor in each module (DKA/CHA), including intermediate clusters of other systems and those of the system itself, a function of referring to the table of system supervising information on the shared memory through the common buses, or a function of a simultaneous (broadcasting) through an interruption signal (hot-line) that is directly connected to each microprocessor may be used. This hot-line can be provided on the common buses, and can select all IDs for each MPID in each microprocessor, specified MPID, or a MPID of one to one.

In the procedure of FIG. 5, a lock bit control of the shared memory is made by verifying the QUE by polling the access timing. If this verification places pressure on real data transfer, the real data transfer can be performed flexibility just after completion of transfer by a method that informs the removal of a lock to a specified group of MPs by combining MP interrupting communications such as a broadcast, or by processing with synchronizing among the MPs. However, it is required to introduce a micro-program control to prevent suspension that may be too long.

The clustered bus structure of the present invention provides a device in which bus transfer performance is improved, and in which correction of degeneration and repair operations resulting from a failure in the platter having common buses are possible. Further the modes of use of the buses (bus mode) can be flexibly modified to fit the particular failure encountered. Still further, common system modules such as memory can be accessed from each cluster and across clusters making possible communications between modules across clusters. Possible conflicts of access from the common buses in each cluster are solved by a resource lock control.

Thus, the system in the present invention is equipped with a plural number of clusters which includes control basic units that are connected around duplicated or multiplied common buses, for example, channel controllers or disk controllers, and is equipped with resources and a communication system common to each cluster. This structure of the present invention improves transfer performance of each common bus. Further, in the present invention it is possible to repair a failed part, especially a platter while keeping the system in operation. In the present invention even if a failure in a cluster occurs, it is possible to switch the mode of the common buses in the other clusters to accommodate the failure.

While the present invention has been described in detail and pictorially in the accompanying drawings, it is not limited to such details since many changes and modification recognizable to these of ordinary skill in the art may be made to the invention without departing from the spirit and scope of the invention, and all such modifications as would be obvious to one skilled in the art are intended to be included within the scope of the following claims.

We claim:

1. An apparatus for use in a non-stop storage device having at least two clusters, each including a disk control device having a plurality of channel controllers each of which sends and receives commands and data to and from an upper system, and a plurality of disk controllers each of which controls disk units, said apparatus comprising:

a cache, connected to each of said at least two cluster, that temporarily stores data between the upper system and the disk units;

at least two first buses, which are physically independent from each other, included in a first cluster, being connected to said channel controllers and said disk controllers of said first cluster and said cache of said apparatus; and at least two second buses, which are physically independent from each other, included in a second cluster, being connected to said channel controllers and said disk controllers of said second cluster and said cache of said apparatus;

wherein said first cluster and said second cluster are physically independent from each other, and said cache is connected across said at least two clusters so as to be accessed from any of said at least two clusters, wherein said cache is connected to said at least two first buses of said first cluster and to said at least two second buses of said second cluster, wherein said first cluster is included in a first platter and said second cluster is included in a second platter, wherein said first platter and said second platter are connected to each other using connectors or cables so as to permit one of the platters having failed to be exchanged with a new platter while maintaining operation of the other platter, wherein said cache stores a specified set of data commonly accessible by said channel controllers or said disk controllers of each of said at least two clusters to control a data transfer mode of each of said at least two clusters to cause continued operation when one of the platters has failed, and wherein said specified set of data commonly accessible by said channel controller or said disk controller of each of said at least two cluster indicates with respect to each of said at least two buses of a cluster a data transfer mode to be set when one or more of said at least two buses of said cluster has failed.

2. The apparatus according to claim 1, wherein said at least two first and said at least two second buses are physically independent of each other, and operate independently with each of said clusters to implement, based on said specified set of data, a sequential data transfer mode in which a plural number of said at least two first and said at least two second buses operate as one logical bus, and in a transaction data transfer mode in which each of said at least two first and said at least two second buses operate independently with respect to each other.

3. The apparatus according to claim 2, wherein said at least two first and said at least two second buses operate mutually independent among clusters such that buses in each cluster can transfer data in a same operating mode of one another or a different operating mode with respect to each other.

4. The apparatus according to claim 1, wherein if one of said buses in a cluster has failed said cluster can operate in a degenerative mode using the remaining buses of said cluster.

5. The apparatus according to claim 4, wherein if a further bus fails in said cluster operating in a degenerative mode a further degenerative operation is performed using a non-failed cluster.

6. The apparatus according to claim 5, wherein when a cluster is to be exchanged, a non-failed cluster performs a degenerative operation as if the cluster being exchanged has failed.

7. The apparatus according to claim 1, wherein when a controller of a cluster is to be exchanged said cluster operates in a degenerative mode using the remaining buses of said cluster with respect to the bus connected to the controller to be exchanged.

8. A non-stop storage device comprising:

a plurality of disk units;

at least two clusters, each including a disk control device having a plurality of channel controllers each of which sends and receives commands and data to and from an upper system and a plurality of disk controllers each of which controls said disk units;

a cache, connected to each of said at least two cluster, that temporarily stores data between said upper system and said disk units, wherein said at least two clusters are independent of each other;

at least two first buses, which are physically independent from each other, included in a first cluster, being connected to said channel controllers and said disk controllers of said first cluster and said cache; and at least two second buses, which are physically independent from each other, included in a second cluster, being connected to said channel controllers and said disk controllers of said second cluster and said cache, wherein said cache is connected to said at least two first buses of said first cluster and to said at least two second buses of said second cluster, wherein said first cluster is included in a first platter and said second cluster is included in a second platter, wherein said first platter and said second platter are connected to each other using connectors or cables so as to permit one of the platters having failed to be exchanged with a new platter while maintaining operation of the other platter, and wherein said cache stores a specified set of data commonly accessible by said channel controllers or disk controllers of each of said at least two clusters to control a data transfer mode of each of said at least two clusters to cause continued operation when one of the platters has failed, and wherein said specified set of data commonly accessible by said channel controller or said disk controller of each of said at least two cluster indicates with respect to each of said at least two buses of a cluster a data transfer mode to be set when one or more of said at least two buses of said cluster has failed.

9. The non-stop storage device according to claim 8, wherein said at least two first and said at least two second buses are physically independent of each other, and operate independently with each of said clusters to implement, based on said specified set of data, a sequential data transfer mode in which a plural number of said at least two first and said at least two second buses operate as one logical bus, and in a transaction data transfer mode in which each of said at least two first and said at least two second buses operate independently with respect to each other.

10. The non-stop storage device according to claim 9, wherein said at least two first and said at least two second buses operate mutually independent among clusters such that buses in each cluster can transfer data in a same operating mode of one another or a different operating mode with respect to each other.

11. The non-stop storage device according to claim 8, wherein if one of said buses in a cluster has failed said cluster can operate in a degenerative mode using the remaining buses of said cluster.

12. The non-stop storage device according to claim 11, wherein if a further bus fails in said cluster operating in a degenerative mode a further degenerative operation is performed using a non-failed cluster.

13. The non-stop storage device according to claim 12, wherein when a cluster is to be exchanged, a non-failed cluster performs a degenerative operation as if the cluster being exchanged has failed.

14. The non-stop storage device according to claim 8, wherein when a controller of a cluster is to be exchanged said cluster operates in a degenerative mode using the remaining buses of said cluster with respect to the bus connected to the controller to be exchanged.

15. An apparatus for use in a non-stop storage device having at least two clusters, each including a disk control device having a plurality of channel controllers each of which sends and receives commands and data to and from an upper system, and a plurality of disk controllers each of which controls disk units, said apparatus comprising:

a first bus included in a first cluster, and connected to said channel controllers and said disk controllers of said first cluster;

a second bus included in a second cluster, and connected to said channel controllers and said disk controllers of said second cluster; and a common resource which is connected to said first bus of said first cluster and said second bus of said second cluster, wherein said first cluster and said second cluster are physically independent from each other, and said common resource is connected to each of said at least two clusters so as to be accessed from any of said at least two clusters, wherein said first cluster is included in a first platter and said second cluster is included in a second platter, wherein said first platter and said second platter are connected to each other using connectors or cables so as to permit one of the platters having failed to be exchanged with a new platter while maintaining operation of the other platter, wherein said common resource stores a specified set of data commonly accessible by said channel controllers or disk controllers of each of said clusters to control a data transfer mode of said cluster to cause continued operation when one of the platters has failed, and wherein said specified set of data commonly accessible by said channel controller or said disk controller of each of said at least two cluster indicates with respect to said bus of a cluster a data transfer mode to be set when said bus of said cluster has failed.

16. The apparatus according to claim 15, wherein said first and second buses operate independently with each of said clusters to implement, based on said specified set of data, a sequential data transfer mode in which a plural number of said first and second buses operate as one logical bus, and in a transaction data transfer mode in which each of said first and second buses operate independently with respect to each other.

17. The apparatus according to claim 16, wherein said first and second buses operate mutually independent among clusters such that buses in one cluster can transfer data in a same operating mode of another cluster or a different operating mode with respect to another cluster.

18. The apparatus according to claim 15, wherein if one of said buses in a cluster has failed said cluster can operate in a degenerative mode.

19. The apparatus according to claim 15, wherein if said bus fails in a cluster a degenerative mode is performed using a non-failed cluster.

20. The apparatus according to claim 19 wherein when a cluster is to be exchanged, a non-failed cluster performs a degenerative operation as if the cluster being exchanged has failed.

21. The apparatus according to claim 15, wherein when a controller of a cluster is to be exchanged said cluster operates in a degenerative mode.

22. The apparatus according to claim 15, wherein said specified set of data is a command to control data transfer mode in a cluster.

* * * * *